(12) United States Patent
He (10) Patent No.: US 12,192,349 B2
(45) Date of Patent: Jan. 7, 2025

(54) UNMANNED DRIVING INFORMATION STORAGE AND PLAYBACK METHOD, DEVICE AND STORAGE MEDIUM

(71) Applicant: Black Sesame Technologies Inc., San Jose, CA (US)

(72) Inventor: Kexin He, Chengdu (CN)

(73) Assignee: Black Sesame Technologies Inc., San Jose, CA (US)

( * ) Notice: Subject to any disclaimer, the term of this patent is extended or adjusted under 35 U.S.C. 154(b) by 250 days.

(21) Appl. No.: 17/686,192

(22) Filed: Mar. 3, 2022

(65) Prior Publication Data

US 2022/0286277 A1    Sep. 8, 2022

(30) Foreign Application Priority Data

Mar. 8, 2021  (CN) .......................... 202110251943.1

(51) Int. Cl.
*H04L 9/08* (2006.01)
*H04L 9/32* (2006.01)

(52) U.S. Cl.
CPC .............. *H04L 9/088* (2013.01); *H04L 9/3236* (2013.01)

(58) Field of Classification Search
CPC ................................ H04L 9/088; H04L 9/3236
See application file for complete search history.

(56) References Cited

U.S. PATENT DOCUMENTS

| | | | |
|---|---|---|---|
| 11,100,533 B1 * | 8/2021 | Taubeneck | H04L 9/0866 |
| 2019/0319798 A1 * | 10/2019 | Chalkias | H04L 9/3236 |
| 2019/0385269 A1 * | 12/2019 | Zachary | H04N 7/18 |
| 2020/0311848 A1 * | 10/2020 | Weldemariam | G06Q 20/3224 |
| 2020/0363994 A1 * | 11/2020 | Jing | G06F 3/067 |
| 2022/0094556 A1 * | 3/2022 | Vestemean | H04L 9/3247 |

FOREIGN PATENT DOCUMENTS

| | | | | |
|---|---|---|---|---|
| CN | 108765626 A | | 11/2018 | |
| CN | 108897760 A | * | 11/2018 | |
| CN | 109447809 A | * | 3/2019 | ......... G06K 9/00711 |
| CN | 109509095 A | * | 3/2019 | ......... G06K 9/00711 |
| CN | 109543065 A | * | 3/2019 | ......... H04N 21/8547 |

(Continued)

*Primary Examiner* — Philip J Chea
*Assistant Examiner* — Ghizlane Maazouz
(74) *Attorney, Agent, or Firm* — Timothy T. Wang; Ni, Wang & Massand, PLLC (57) ABSTRACT

The application relates to a method, a device and a storage medium for storing and playing back unmanned driving information, wherein the unmanned driving information storage method comprises the following steps of: acquiring a plurality of data signals associated with an abnormal event when the abnormal event of an unmanned vehicle is monitored; calculating a first hash value for each data signal; storing each first hash value and the corresponding data signal as a key value pair in a key value database respectively; generating a first Merkel tree based on each first hash value; and storing the first Merkel tree and critical data signals of the plurality of data signals into a blockchain, and generating corresponding electronic money addresses and transaction timestamps. By this method, the correctness, integrity, fairness, and credibility of abnormal field data can be guaranteed, and too much storage space will not be occupied at the same time.

7 Claims, 6 Drawing Sheets

(56) References Cited

FOREIGN PATENT DOCUMENTS

| CN | 106407795 | A |   | 5/2019  |             |
|----|-----------|---|---|---------|-------------|
| CN | 110990378 | A | * | 4/2020  | G06F 16/214 |
| CN | 111368326 | A | * | 7/2020  | B60W 50/0098 |
| CN | 111915931 | A | * | 11/2020 |             |
| CN | 111444197 | B | * | 12/2020 | G06F 16/2255 |
| CN | 112074856 | A | * | 12/2020 | G06F 16/27  |
| CN | 108711052 | B | * | 4/2021  | G06Q 20/3825 |
| CN | 114281793 | A |   | 4/2022  |             |
| CN | 110460590 | B | * | 7/2022  | H04L 63/08  |
| CN | 112084201 | B | * | 4/2024  | G06F 16/2255 |

\* cited by examiner

UNMANNED DRIVING INFORMATION STORAGE AND PLAYBACK METHOD, DEVICE AND STORAGE MEDIUM

FIELD OF THE INVENTION

The application relates to the technical field of unmanned driving, in particular to a method, a device, and a storage medium for storing and playing back unmanned driving information.

BACKGROUND OF THE INVENTION

Research shows that fully automatic unmanned vehicles have certain advantages in enhancing road safety, relieving traffic congestion, relieving parking difficulties and reducing air pollution. Therefore, in recent years, vehicle-oriented automatic unmanned driving technology has gained more and more attention and development. However, at this stage, unmanned driving technology is still facing great challenges. In addition to relying on a large number of expensive high-speed sensors, powerful and safe high-performance computing hardware platforms, deep learning algorithms and other complex software algorithm modules, unmanned driving technology will also encounter problems such as driving safety, privacy protection, imperfect infrastructure, driving legislation and accident accountability. In particular, because unmanned vehicles are not operated by drivers, unmanned vehicles shift more responsibilities from drivers to vehicle manufacturers and software designers, thus completely changing the legal liability of previous traffic accidents and completely subverting the legal system and insurance rules established on that basis. As unmanned vehicles need a process to be put into the market, the responsibility situation of mixing new and old vehicles will exist for a long time. Once unmanned vehicles break down and have accidents, it is difficult to define the responsibility for accidents. Therefore, it is very important to save the abnormal field data and keep the saved abnormal field data correct, complete, fair and credible when an abnormal event happens to the unmanned vehicle. In addition, it is also very important for the whole unmanned driving system to make unmanned vehicle manufacturers can play back the stored abnormal field data offline and analyze the abnormal reasons so as to correct the system defects and optimize the unmanned driving algorithm.

In the existing technology, all driving data generated by unmanned vehicles during driving are stored in distributed storage devices, and the root hashes of all these data are stored in a blockchain. However, due to the large amount of driving data generated by unmanned vehicles during driving, a large amount of bandwidth and storage space are needed to store the driving information, and due to the properties of distributed storage devices, integrity, fairness and credibility of the stored data cannot be ensured.

Therefore, it is necessary to provide a method, a device and a storage medium for storing and playing back unmanned driving information, so as to ensure the correctness, integrity, fairness and credibility of abnormal field data without occupying too much storage space.

SUMMARY OF THE INVENTION

In view of the above technical problems, the present application provides a method, a device, and a storage medium for storing and playing back unmanned driving information, which can effectively ensure the correctness, integrity, fairness and credibility of abnormal field data without occupying too much storage space.

In a first aspect of the application, an unmanned driving information storage method is provided, which comprises the following steps: acquiring a plurality of data signals associated with an abnormal event when the abnormal event of an unmanned vehicle is monitored; calculating a first hash value for each data signal; storing each first hash value and the corresponding data signal as a key value pair in a key value database respectively; generating a first Merkel tree based on each first hash value; and storing the first Merkel tree and critical data signals of the plurality of data signals into a blockchain, and generating corresponding electronic money addresses and transaction timestamps.

In one implementation, the unmanned driving information storage method further comprises: before calculating a first hash value for each data signal, compressing each data signal, and encrypting each compressed data signal with a key; and while storing the first Merkel tree and the critical data signals of the plurality of data signals into the blockchain, storing the key into the blockchain.

In one implementation, the unmanned driving information storage method further comprises: storing a root hash value of the first Merkel tree and all leaf hash values of the first Merkel tree as a key-value pair in the key-value database.

In one implementation, the unmanned driving information storage method further comprises: calculating second hash values for the electronic money address and the transaction timestamp respectively; merging the two second hash values to calculate a second root hash value; and storing the second root hash value and the money transaction address and the transaction timestamp as a key-value pair in the key-value database.

In one implementation, the critical data signal is a data signal necessary for determining the cause of the abnormal event among the plurality of data signals.

In a second aspect of the application, there is also provided an unmanned driving information playback method, which comprises: acquiring an electronic money address and a transaction timestamp associated with an abnormal event of an unmanned vehicle; acquiring a first Merkel tree from a blockchain based on the electronic money address and the transaction timestamp; acquiring a plurality of data signals from a key value database based on a root hash value of the first Merkel tree; generating a second Merkel tree based on the plurality of data signals; comparing the second Merkel tree with the first Merkel tree; and acquiring a critical data signal from the blockchain based on the electronic money address and the transaction timestamp when the second Merkel tree is inconsistent with the first Merkel tree.

In one implementation, acquiring the electronic money address and the transaction timestamp associated with the abnormal event of the unmanned vehicle comprises: according to the second root hash value, acquiring the electronic money address and the transaction timestamp from the key value database.

In one implementation, acquiring a plurality of data signals from the key value database based on the root hash value of the first Merkel tree comprises: acquiring a plurality of first hash values from the key value database based on the root hash value of the first Merkel tree; and acquiring the plurality of data signals from the key value database based on each of the first hash values.

In one implementation, generating the second Merkel tree based on the plurality of data signals comprises: calculating a third hash value for each data signal; generating a second Merkel tree based on the third hash value.

In one implementation, the method further comprises: if the second Merkel tree is inconsistent with the first Merkel tree, identify leaf nodes that are inconsistent with the second Merkel tree to determine tampered data signals among the plurality of data signals.

In one implementation, the method further comprises: acquiring a key from the blockchain while acquiring the first Merkel tree from the blockchain; and decrypting the plurality of data signals by using the key if the second Merkel tree is consistent with the first Merkel tree.

In a third aspect of the application, there is also provided an unmanned driving information storage device, which comprises a memory in which a machine executable program is stored; and a processor which, when executing the machine executable program, performs the unmanned driving abnormal information storage method according to the first aspect of the application.

In a fourth aspect of the application, there is also provided an unmanned driving information playback device, which comprises a memory in which a machine executable program is stored; and the processor, when executing the machine executable program, performs the unmanned driving information playback method according to the second aspect of the application.

In a fifth aspect of the present application, there is also provided a computer-readable storage medium storing a computer program which, when executed by a processor, performs the unmanned abnormal information storage method according to the first aspect of the present application.

In a sixth aspect of the present application, there is also provided a computer-readable storage medium storing a computer program which, when executed by a processor, performs the unmanned driving information playback method according to the second aspect of the present application.

DETAILED DESCRIPTION OF THE INVENTION

In order to make the above objects, features, and advantages of the application more obvious and understandable, specific embodiments of the present invention will be described in detail with reference to the accompanying drawings. In the following description, numerous specific details are set forth in order to provide a thorough understanding of the present invention. However, the invention can be implemented in many other ways different from those described here, and those skilled in the art can make similar improvements without violating the connotation of the invention, so the invention is not limited by the specific embodiments disclosed below.

In the description of this specification, the terms "first" and "second" are only used to distinguish different technical features, but cannot be understood as indicating or implying relative importance or order of the indicated technical features. In the description of the present invention, "a plurality of" means two or more, unless otherwise specifically defined.

Figure 1:
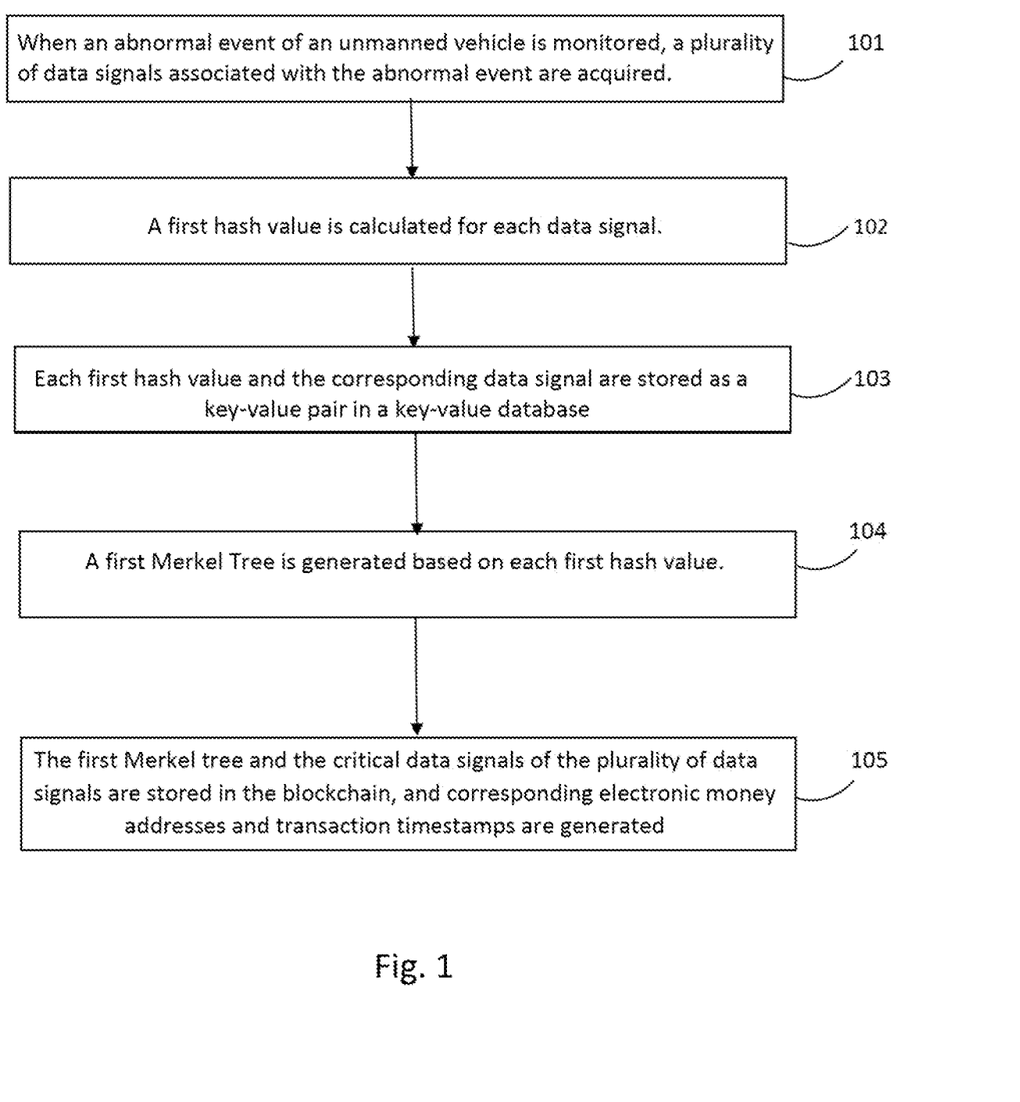
FIG. 1 shows an example flow chart of an unmanned driving information storage method according to one embodiment of the present application.

In one embodiment, as shown in FIG. 1, the application provides an unmanned driving information storage method, which may include steps 101-105.

At step 101, when an abnormal event of an unmanned vehicle is monitored, a plurality of data signals associated with the abnormal event are acquired. By way of example only, abnormal events may include, for example, vehicle collision events, vehicle out of control events, vehicle alarm events (i.e., vehicle failure), and the like. A plurality of data signals associated with the abnormal event may include time stamp signals indicating the time when the abnormal event occurs in the unmanned vehicle, position signals indicating the position of the unmanned vehicle when the abnormal event occurs, sensor signals detected by various sensors installed or fixed on the unmanned vehicle when the abnormal event occurs, and data signals of corresponding planning, decision-making and control instruction. By way of example only, the sensor signals detected by each sensor installed or fixed on the unmanned vehicle when the abnormal event occurs may include video frames captured by cameras, LIDAR point cloud data, ultrasonic radar data, millimeter wave radar data, and the like. Data signals of planning, decision-making and control instruction are obtained through calculation by a software system of the unmanned vehicle by using sensor data signals and algorithm modules, which mainly indicate data signals associated with automatic driving path planning, automatic driving behavior decision-making and automatic driving execution control of the unmanned vehicle. Unmanned vehicles actually generate a large amount of data during driving. In this application, only the plurality of data signals associated with abnormal events are acquired, instead of acquiring all the data generated during driving as in the prior art, so this application can greatly reduce the amount of data that needs to be saved and processed.

Figure 3:
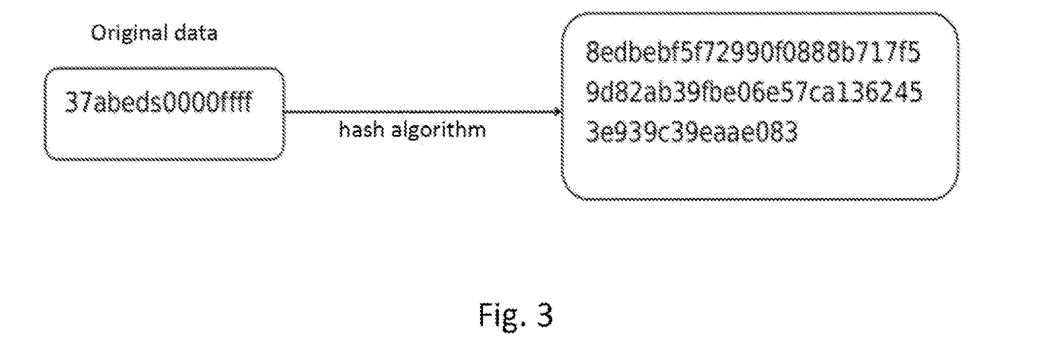
FIG. 3 shows an example schematic diagram of hash calculation according to an embodiment of the present application.

At step 102, a first hash value is calculated for each data signal. For example, a hash algorithm such as SHA1, SHA256 can be used to sequentially calculate a corresponding first hash value (an example of a data signal is a string of characters on the left in FIG. 3, for example) for each data signal. Since each first hash value calculated by the hash algorithm is unique, it can be used as the unique identifier of the corresponding data signal.

At step 103, each first hash value and the corresponding data signal are stored as a key-value pair in a key-value database. That is, in this application, each first hash value is taken as a key, and the corresponding data signal is stored as a value in a first table in the key value database. For convenience of understanding, an example of this first table is shown in Table 1 below. It should be noted that although Table 1 includes four first hash values and four corresponding data signals, more or less first hash values and data signals may be included according to the actual situation.

TABLE 1

| key | value |
| --- | --- |
| first hash value 0 | Data signal 0 |
| first hash value 1 | Data signal 1 |
| first hash value 2 | Data signal 2 |
| first hash value 3 | Data signal 3 |

At step 104, a first Merkel Tree is generated based on each first hash value. The purpose of generating the first Merkel tree is to organize the first hash values of the data signals more efficiently, so as to improve the efficiency of searching and matching them, and further help to improve the efficiency of verifying their integrity and reliability.

Specifically, in this application, the first Merck tree can be generated by merging two adjacent first hash values into a character string, and then calculating the hash values of the character string by using a hash algorithm such as SHA1 or SHA256 to obtain corresponding sub-hash values. In this way, every two first hash values are used as a pair to calculate a corresponding sub-hash value, thus acquiring a group of "sub-hash values", which are recursively generated until the first Merkel tree and its root hash values are generated.

Figure 4:
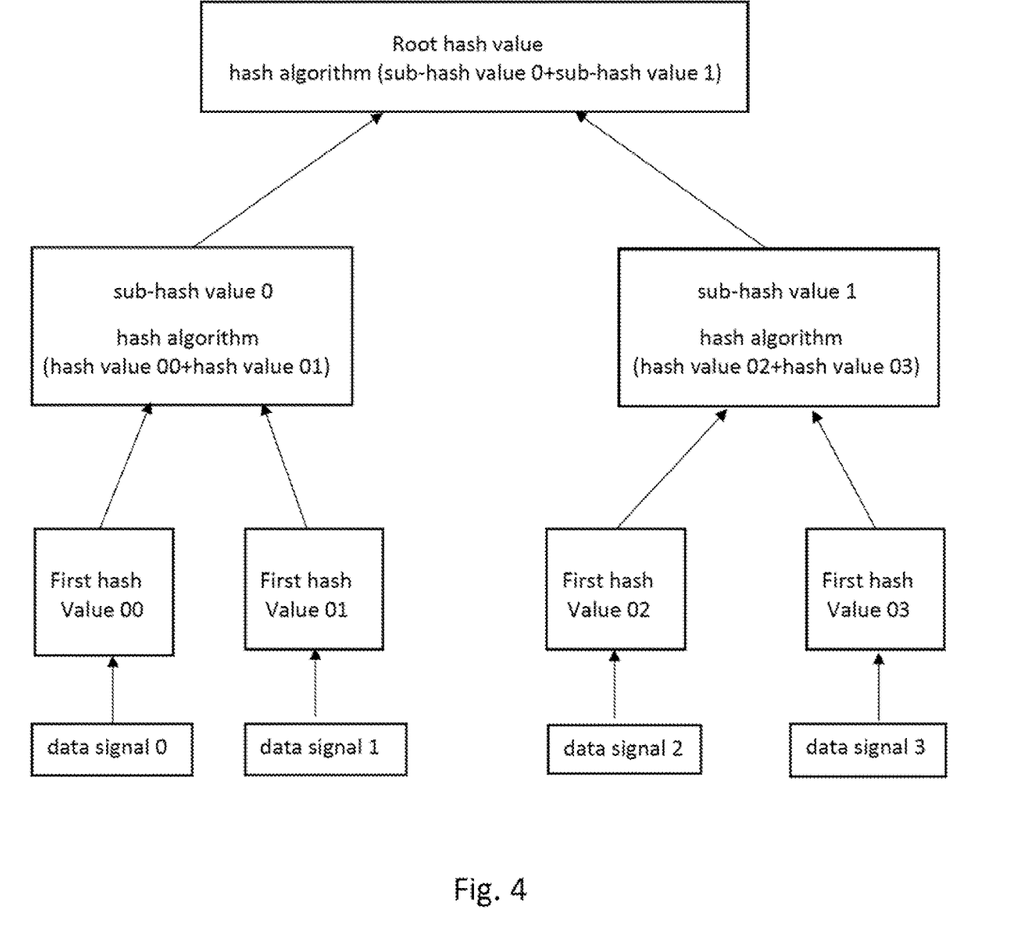
FIG. 4 shows an example schematic diagram of a first Merkel tree according to an embodiment of the present application.

For illustrative purposes only, an example of a method for generating the first Merkel tree is shown in FIG. 4. In FIG. 4, a first hash value 00, a first hash value 01, a first hash value 02 and a first hash value 03 have been generated for a data signal 0, a data signal 1, a data signal 2 and a data signal 3, respectively. In order to generate the first Merkel tree, the adjacent first hash value 00 and the first hash value 01 are merged into a character string, and a hash value of the character string is calculated by using a hash algorithm such as SHA1 or SHA256, so as to obtain a sub-hash value 0; the adjacent first hash value 02 and first hash value 03 are merged into a character string, and the hash value of the character string is calculated by using a hash algorithm such as SHA1 or SHA256, so as to obtain a sub-hash value 1. Then, the sub-hash value 0 and the sub-hash value 1 are merged into a character string, and the hash value of the character string is calculated by using a hash algorithm such as SHA1 or SHA256, so as to obtain an entire Merkel tree and a corresponding root hash value. In FIG. 4, there are four data signals, that is, there are four first hash values, however, in practical applications, there may be more or less data signals, so there are more or less first hash values. Therefore, in those cases, the first Merkel tree and its corresponding root hash value can be generated based on more or less first hash values.

Although in FIG. 1, step 103 is depicted as occurring before step 104, in actual use, step 103 may also occur after step 104, or occur simultaneously with step 104, without departing from the scope claimed in this application. At step 105, the first Merkel tree and the critical data signals of the plurality of data signals are stored in the blockchain, and corresponding electronic money addresses and transaction timestamps are generated. In this application, a critical data signal refers to a data signal necessary for determining the cause of the abnormal event, such as data signals of planning, decision-making and control instruction. In this application, because the critical data are saved in the blockchain, the integrity, fairness and credibility of these critical data signals can be effectively ensured. It should be understood that in this embodiment, the electronic money address refers to the address where the first Merkel tree and the critical data signals are stored in the blockchain, and the transaction timestamp refers to the time when the first Merkel tree and the critical data signals are stored in the blockchain. Therefore, based on the electronic money address and the transaction timestamp, the first Merkel tree and the critical data signals can be read out from the blockchain when necessary.

Figure 2:
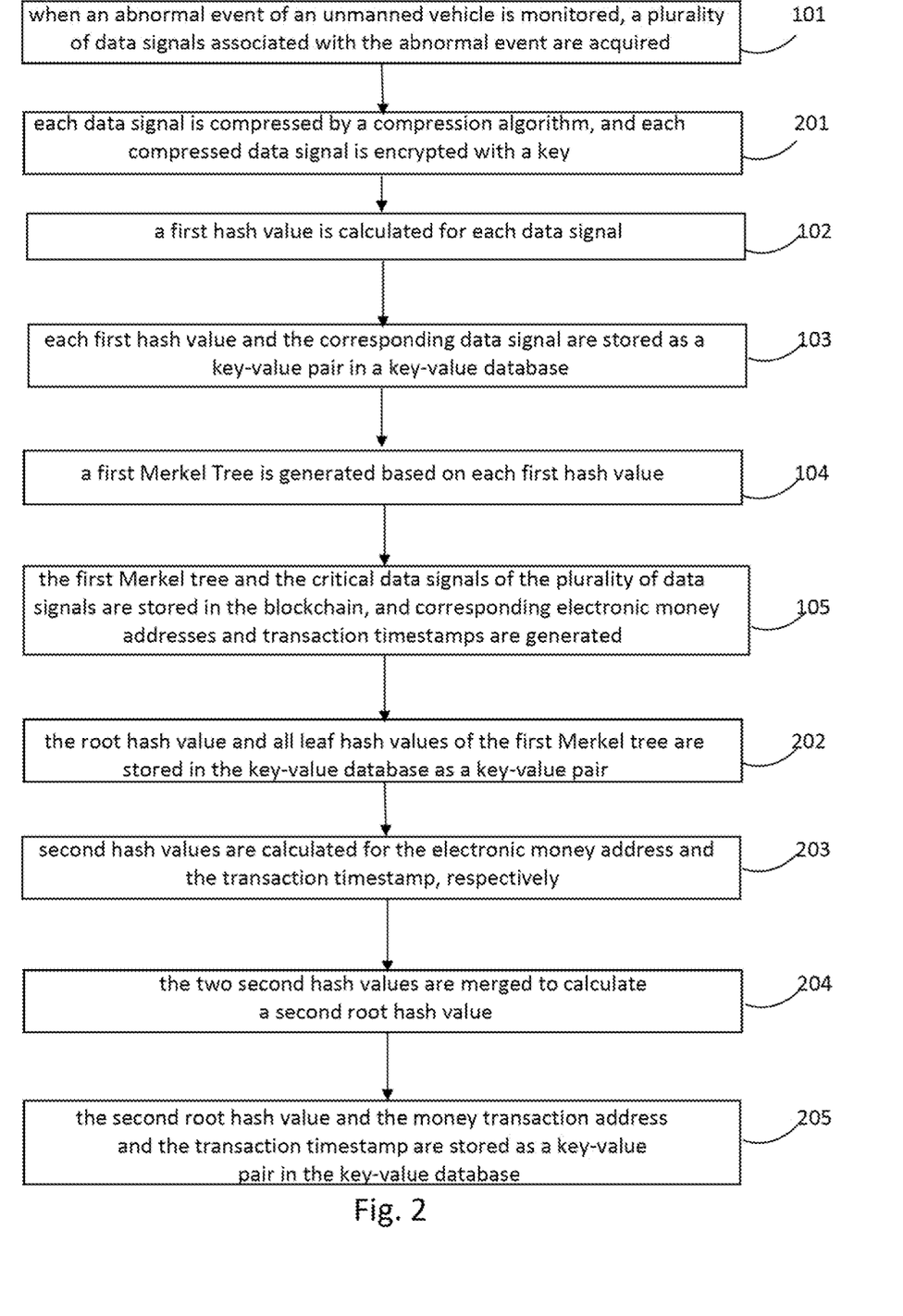
FIG. 2 shows an example flowchart of an unmanned driving information storage method according to other embodiments of the present application.

Referring to FIG. 2, in an embodiment of the present application, before calculating the first hash value for each data signal, the unmanned driving information storage method of the present application may further include step 201. In step 201, each data signal is compressed by a compression algorithm, and each compressed data signal is encrypted with a key. Compression can help to further reduce the amount of data stored in the key-value database and the blockchain, thus saving storage space and bandwidth. Encrypting each compressed data signal with a key can guarantee the security and privacy of each data signal.

It should be noted that after step 201 is executed, in step 105, the first Merkel tree and the critical data signals of the plurality of data signals are stored in the blockchain, and at the same time, the key also needs to be stored in the blockchain. It should be understood that in this embodiment, the electronic money address refers to the address where the first Merkel tree, the key and the critical data signal are stored in the blockchain, and the transaction timestamp refers to the time when the first Merkel tree, the key and the critical data signal are stored in the blockchain. Therefore, based on the electronic money address and the transaction timestamp, the first Merkel tree, the key and the critical data signals can be read out from the blockchain when necessary.

With continued reference to FIG. 2, in an embodiment of the present application, the unmanned driving information storage method of the present application may further include step 202. In step 202, the root hash value and all leaf hash values of the first Merkel tree generated in step 105 may be stored in the key-value database as a key-value pair. Specifically, the root hash value of the first Merkel tree is used as a key, and all the leaf hash values of the first Merkel tree are stored as values in a second table of the key-value database. For convenience of understanding, an example of this second table is shown in Table 2 below. Specifically, this example is an example of saving the root hash value and all leaf hash values of the first Merkel tree shown in FIG. 4 in the key value database.

TABLE 2

| key | value |
| --- | --- |
| Root hash value of the first Merkel tree | first hash value 00, first hash value 01, first hash value 02, first hash value 03, sub-hash value 0, sub-hash value 1 |

Although in FIG. 2, step 105 is depicted as occurring before step 202, in actual use, step 105 may also occur after step 202, or simultaneously occur with step 202, without departing from the scope claimed in this application. With continued reference to FIG. 2, in the embodiment of this application, the unmanned driving information storage method described in this application may further include steps 203-205.

At step 203, second hash values are calculated for the electronic money address and the transaction timestamp, respectively. For example, a hash algorithm such as SHA1 or SHA256 may be used to calculate corresponding second hash values for the electronic money address and the transaction timestamp sequentially.

At step 204, the two second hash values are merged to calculate a second root hash value. Specifically, the second root hash value can be obtained by merging the second hash value calculated for the electronic money address and the second hash value calculated for the transaction timestamp into one character string, and then calculating the hash value of the character string by using a hash algorithm such as SHA1 or SHA256.

At step 205, the second root hash value and the money transaction address and the transaction timestamp are stored as a key-value pair in the key-value database. Specifically, the second root hash values and the money transaction address and the transaction timestamp can be saved in a third table of the key value database by taking the second root hash value as a key and taking the money transaction address and transaction timestamp as values. For convenience of understanding, an example of this third table is shown in Table 3 below. In one implementation, the second root hash value can be sent to a user and the right to query the corresponding key value database table (for example, Table 3) can be opened to the user, so that the user can retrieve the corresponding money transaction address and the transaction timestamp according to the second root hash value for use during data playback. In another implementation, the money transaction address and the transaction timestamp can also be directly sent to the user for data playback.

TABLE 3

| key | value |
|---|---|
| Second root hash value | Electronic money address and transaction timestamp |

Figure 5:
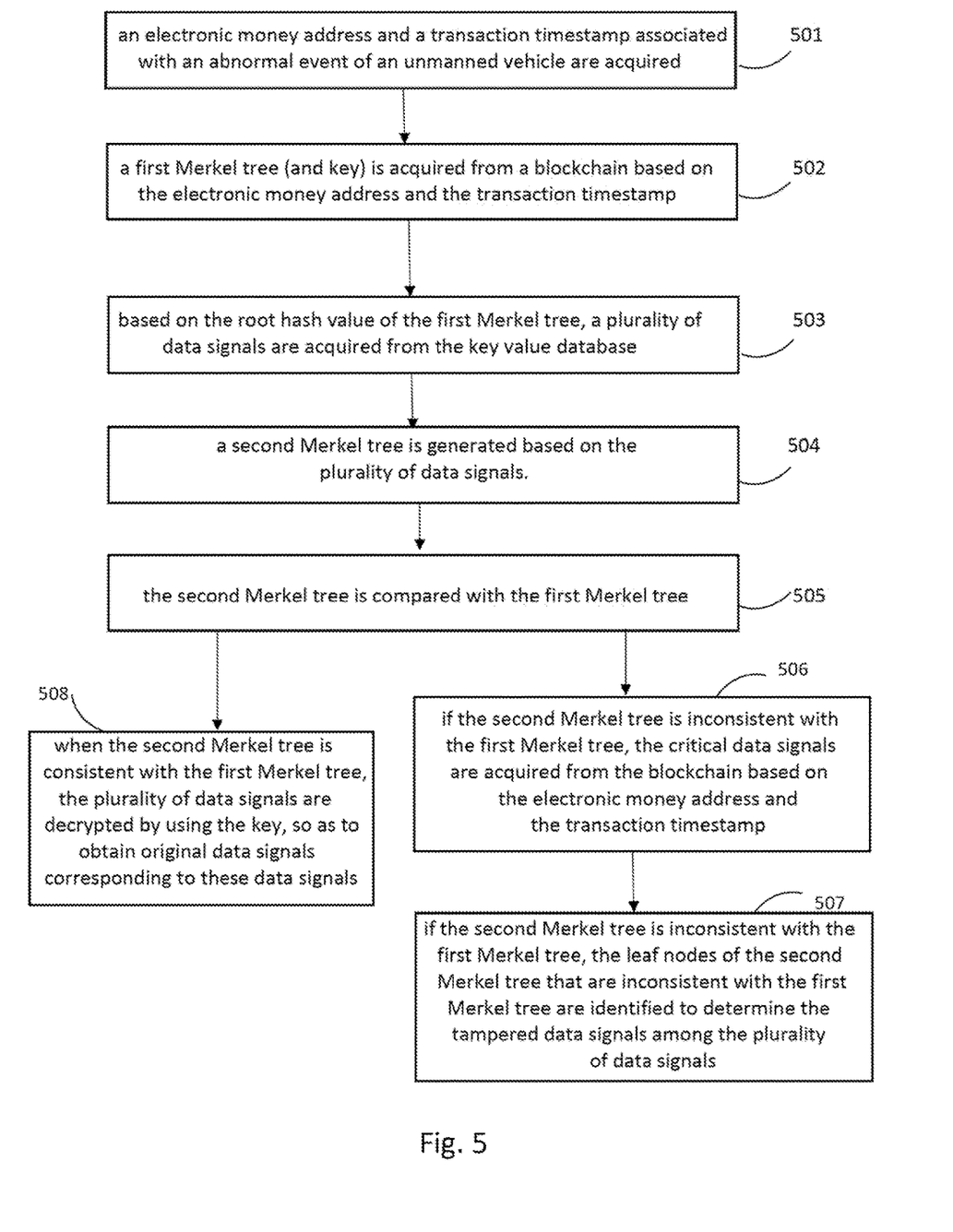
FIG. 5 shows an example flow chart of an unmanned driving information playback method according to an embodiment of the present application.

The stored unmanned driving information can be played back when needed, so that relevant departments can use the information to restore the accident scene and assign responsibility for the accident. Therefore, in this application, an unmanned driving information playback method is also provided. As shown in FIG. 5, in an embodiment, the method may include steps 501-506.

At step 501, an electronic money address and a transaction timestamp associated with an abnormal event of an unmanned vehicle are acquired. In one implementation, in an embodiment where the corresponding unmanned driving information storage method includes steps 203-205, step 501 may include acquiring the electronic money address and the transaction timestamp from the key value database table (for example, from the third table of the key value database) according to the second root hash value. In another implementation, in the case where the electronic money address and the transaction timestamp are directly sent to the user, the user can directly obtain the electronic money address and the transaction timestamp.

At step 502, a first Merkel tree is acquired from a blockchain based on the electronic money address and the transaction timestamp. In an implementation, when the corresponding unmanned driving information storage method further includes step 201, the first Merkel tree is acquired from the blockchain based on the electronic money address and the transaction timestamp, and the corresponding key is also acquired from the blockchain. As mentioned above, in this application, the electronic money address refers to the address where the first Merkel tree, the key and the critical data signal are stored in the blockchain, and the transaction timestamp refers to the time when the first Merkel tree, the key and the critical data signal are stored in the blockchain. Therefore, based on the electronic money address and the transaction timestamp, the first Merkel tree, the key and the critical data signal can be read from the blockchain. In this application, a critical data signal refers to a data signal necessary for determining the cause of the abnormal event, such as data signals of planning, decision-making and control instruction.

At step 503, based on the root hash value of the first Merkel tree, a plurality of data signals is acquired from the key value database. These data signals may include, for example, a time stamp signal indicating the time when an abnormal event occurs in the unmanned vehicle, a position signal indicating the position of the unmanned vehicle when the abnormal event occurs, sensor signals detected by various sensors installed or fixed on the unmanned vehicle when the abnormal event occurs, and data signals of corresponding planning, decision-making and control instruction. In one implementation, this step 503 may include acquiring a plurality of first hash values from the key-value database (e.g., from the second table of the key-value database) based on the root hash value of the first Merkel tree, and acquiring a plurality of data signals from the key-value database (e.g., from the first table of the key-value database) based on each first hash value.

At step 504, a second Merkel tree is generated based on the plurality of data signals. In one implementation, this step 504 may include calculating a third hash value for each data signal, and generating a second Merkel tree based on the third hash values.

In step 505, the second Merkel tree generated in step 504 is compared with the first Merkel tree.

At step 506, if the second Merkel tree is inconsistent with the first Merkel tree, the critical data signals are acquired from the blockchain based on the electronic money address and the transaction timestamp. In a case where the corresponding unmanned driving information storage method further includes step 201, step 506 may further include decrypting the critical data signal with the key, so as to obtain the data signal necessary for determining the cause of the abnormal event. In case that the second Merkel tree is inconsistent with the first Merkel tree, it means that at least one item of data stored in the database has been tampered, and by acquiring the critical data signals from the blockchain, it can be ensured that credible critical data signals can be completely restored, thus helping relevant departments to restore the accident scene and assign responsibility for the accident when an unmanned vehicle has an abnormal situation such as a traffic accident.

With continued reference to FIG. 5, in the embodiment of the present application, the unmanned driving information playback method may further include step 507. At step 507, if the second Merkel tree is inconsistent with the first Merkel tree, the leaf nodes of the second Merkel tree that are inconsistent with the first Merkel tree may also be identified to determine the tampered data signals among the plurality of data signals. Through this step, it is easy to identify which part of the data has been tampered with, which can help unmanned vehicle manufacturers to constantly correct and optimize the automatic driving algorithm.

In an implementation, that is, when the corresponding unmanned driving information storage method further includes step 201, the application may further include step 508. At step 508, when the second Merkel tree is consistent with the first Merkel tree, the plurality of data signals is decrypted by using the key, so as to obtain original data signals corresponding to these data signals.

Figure 6:
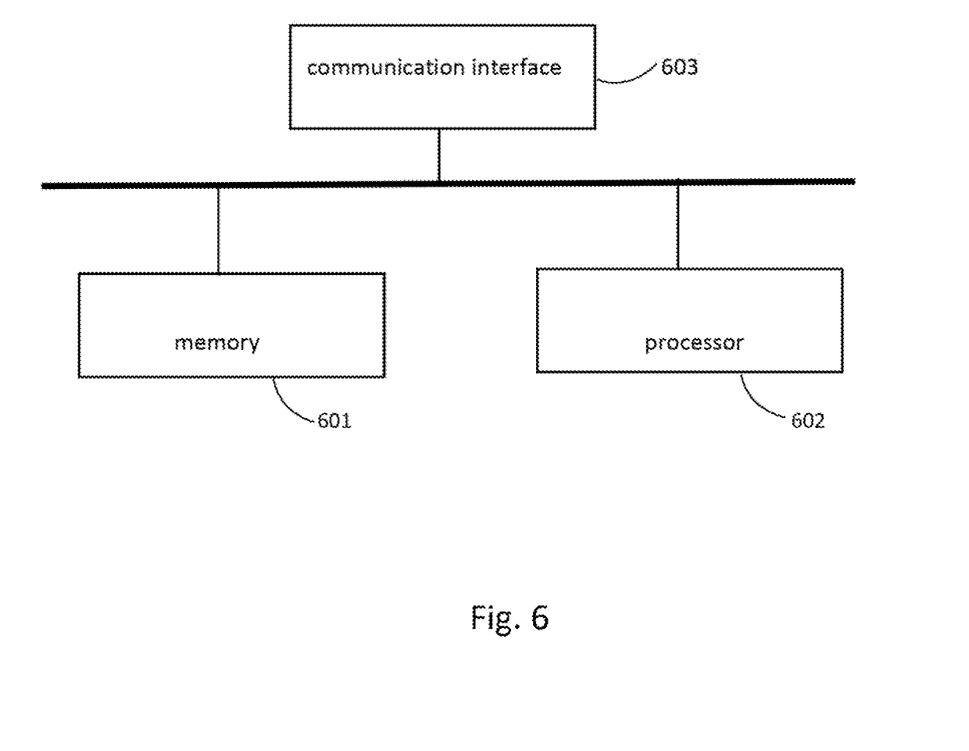
FIG. 6 shows a schematic structural block diagram of an unmanned driving information storage device or an unmanned driving information playback device according to an embodiment of the present application.

According to an embodiment, the application also provides an unmanned driving information storage device and a corresponding unmanned driving information playback device, as shown in FIG. 6. Both devices include a memory 601 and a processor 602, and the memory 601 stores a machine executable program. When executing the machine executable program, the processor 602 implements the unmanned driving information storage device and the corresponding unmanned driving information playback device described in the above embodiments. In this application, the number of the memory 601 and the processor 602 may be one or more. In this application, the unmanned driving information storage device and the corresponding unmanned driving information playback device can be implemented by electronic devices, which is intended to represent various forms of digital computers, such as laptop computers, desktop computers, workstations, personal digital assistants, servers, blade servers, mainframe computers, and other suitable computers. The electronic devices can also represent various forms of mobile devices, such as personal digital assistants, cellular phones, smart phones, wearable devices, and other similar computing devices. In this application, these two devices can be implemented in separate electronic devices or in the same electronic device.

The unmanned driving information storage device and the corresponding unmanned driving information playback device may also each include a communication interface 603, which is used to communicate (wired or wireless) with external devices (for example, a blockchain system for implementing a blockchain and a key value database, etc.) for data interaction with them. In one implementation, the key value database can be implemented in the same electronic device as the unmanned driving information storage device and the corresponding unmanned driving information playback device. In another implementation, the key value database can also be implemented in a separate electronic device from the unmanned driving information storage device and the corresponding unmanned driving information.

The memory 601 may include nonvolatile memory and volatile memory. The nonvolatile memory may include, for example, a Read-Only Memory (ROM), a magnetic tape, a floppy disk, a flash memory, or an optical memory. The volatile memory may include, for example, a Random Access Memory (RAM) or an external cache memory. By way of illustration, and not limitation, the RAM can be in various forms, such as Static Random Access Memory (SRAM) or Dynamic Random Access Memory (DRAM).

The memory 601, the processor 602, and the communication interface 603 can be connected to each other through a bus to realize mutual communication. The bus can be an Industry Standard Architecture (ISA) bus, a Peripheral Component (PCI) bus or an extended industry standard component (EISA) bus. The bus can be divided into address bus, data bus, control bus, etc. For convenience of illustration, only one thick line is shown in FIG. 5, but it does not mean that there is only one bus or one type of bus.

The above-mentioned embodiments only express several embodiments of this application, and their descriptions are specific and detailed, but they cannot be understood as limiting the scope of the invention patent. It should be noted that, for those of ordinary skill in the field, without departing from the concept of this application, several modifications and improvements can be made, which belong to the protection scope of this application. Therefore, the scope of protection of this application shall be subject to the appended claims.

What is claimed is:

1. An unmanned driving information playback method, comprising:
    acquiring an electronic money address and a transaction timestamp associated with an abnormal event of an unmanned vehicle;
    respectively storing each first hash value and the corresponding data signal as a key value pair in a key value database;
    acquiring a first Merkel tree from a blockchain based on the electronic money address and the transaction timestamp;
    acquiring a plurality of data signals from a key value database based on a root hash value of the first Merkel tree;
    generating a second Merkel tree based on the plurality of data signals;
    comparing the second Merkel tree with the first Merkel tree;
    acquiring a critical data signal from the blockchain based on the electronic money address and the transaction timestamp when the second Merkel tree is inconsistent with the first Merkel tree; and
    if the second Merkel tree is inconsistent with the first Merkel tree, identifying leaf nodes that are inconsistent with the second Merkel tree to determine tampered data signals among the plurality of data signals.

2. The method according to claim 1, wherein acquiring the electronic money address and the transaction timestamp associated with the abnormal event of the unmanned vehicle further comprises:
    according to a second root hash value, acquiring the electronic money address and the transaction timestamp from the key value database.

3. The method according to claim 1, wherein acquiring a plurality of data signals from the key value database based on the root hash value of the first Merkel tree further comprises:
    acquiring a plurality of first hash values from the key value database based on the root hash value of the first Merkel tree; and
    acquiring the plurality of data signals from the key value database based on each of the first hash values.

4. The method according to claim 1, wherein generating the second Merkel tree based on the plurality of data signals comprises:
    calculating a third hash value for each data signal; and
    generating the second Merkel tree based on the third hash value.

5. The method according to claim 1, wherein the method further comprises:
    acquiring a key from the blockchain while acquiring the first Merkel tree from the blockchain; and
    decrypting the plurality of data signals by using the key based on the second Merkel tree being consistent with the first Merkel tree.

6. An unmanned driving information playback device, comprising:
    a memory storing a machine executable program; and a processor that, when executing the machine executable program, performs the unmanned driving information playback method according to claim 1.

7. A non-transitory computer readable storage medium storing a computer program, wherein the computer program, when executed by a processor, performs the unmanned driving information playback method according to claim 1.

* * * * *